(12) United States Patent
Fairchild

(10) Patent No.: US 11,487,493 B2
(45) Date of Patent: Nov. 1, 2022

(54) AUTOMATIC DISPLAY UNIT BACKUP DURING FAILURES OF ONE MORE DISPLAY UNITS THROUGH THE UTILIZATION OF GRAPHIC USER INTERFACE OBJECTS DEFINED FOR CONTROL TRANSFER AND REVERSION AFTER RESOLUTION OF THE FAILURES

(71) Applicant: GE Aviation Systems LLC, Grand Rapids, MI (US)

(72) Inventor: David Allen Fairchild, Alto, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 91 days.

(21) Appl. No.: 16/700,525

(22) Filed: Dec. 2, 2019

(65) Prior Publication Data

US 2020/0104091 A1 Apr. 2, 2020

Related U.S. Application Data

(62) Division of application No. 15/616,905, filed on Jun. 7, 2017, now Pat. No. 10,496,351.

(51) Int. Cl.
 *G06F 3/14* (2006.01)
 *G09G 5/00* (2006.01)
 *G09G 5/12* (2006.01)

(52) U.S. Cl.
 CPC .......... *G06F 3/1438* (2013.01); *G09G 5/003* (2013.01); *G09G 5/12* (2013.01); *G09G 2330/00* (2013.01);
 (Continued)

(58) Field of Classification Search
 None
 See application file for complete search history.

(56) References Cited

U.S. PATENT DOCUMENTS 5,195,040 A 3/1993 Goldsmith
6,112,140 A 8/2000 Hayes et al.
(Continued)

FOREIGN PATENT DOCUMENTS

EP 2518627 A2 10/2012

OTHER PUBLICATIONS

Non-Final Office Action received for U.S. Appl. No. 15/616,905 dated Jan. 4, 2019, 20 pages.
(Continued)

*Primary Examiner* — Kyle Zhai
(74) *Attorney, Agent, or Firm* — Amin, Turocy & Watson, LLP

(57) ABSTRACT

Automatic display unit backup during failures of one more display units through the utilization of graphic user interface objects defined for control transfer and reversion after resolution of the failures is provided herein. A system can comprise a memory operatively coupled to a processor that executes stored executable components comprising a first controller, a second controller, and a failure indication component that provides a first notification based on a first detection of a first failure at the second controller, and a second notification based on a second detection of a second failure at the first controller. Further, the executable components can comprise a control transfer component that automatically transfers control of a second display unit from the v controller to the first controller based on the first notification, or control of a first display unit from the first controller to the second controller based on the second notification.

20 Claims, 10 Drawing Sheets

(52) U.S. Cl.
CPC ..... *G09G 2330/12* (2013.01); *G09G 2370/02* (2013.01); *G09G 2380/12* (2013.01)

(56) References Cited

U.S. PATENT DOCUMENTS

| | | | |
|---|---|---|---|
| 7,808,403 | B2 | 10/2010 | Pouzolz |
| 8,098,175 | B2 | 1/2012 | Berthou et al. |
| 8,812,865 | B2 | 8/2014 | Ganille et al. |
| 9,015,653 | B2 | 4/2015 | Leconte et al. |
| 9,384,529 | B2 | 7/2016 | Danielsson et al. |
| 2007/0046680 | A1 | 3/2007 | Herdrick et al. |
| 2007/0150077 | A1* | 6/2007 | Bocharov ........... G06F 16/2465 700/29 |
| 2008/0163093 | A1 | 7/2008 | Lorido |
| 2010/0180418 | A1* | 7/2010 | Bodden .............. B64F 5/00 29/402.03 |
| 2010/0289963 | A1 | 11/2010 | LeFort et al. |
| 2017/0262764 | A1* | 9/2017 | Karuppasamy ........ G06N 5/025 |
| 2018/0290729 | A1 | 10/2018 | Shavit |

OTHER PUBLICATIONS

Final Office Action received for U.S. Appl. No. 15/616,905 dated May 24, 2019, 21 pages.
Extended European Search Report received for EP Patent Application Serial No. 18176213.9 dated Nov. 2, 2018, 9 pages.
First Office Action received for Canadian Patent Application Serial No. 3,006,099 dated Mar. 18, 2019, 3 pages.
First Office Action received for Canadian Patent Application Serial No. 3,006,099 dated Mar. 31, 2020, 7 pages.
Communication pursuant to Article 94(3) EPC for EP Application No. 18176213.9 dated Dec. 16, 2020, 4 pages.
Communication pursuant to Article 94(3) EPC for EP Application No. 18176213.9 dated Feb. 24, 2022, 5 pages.

* cited by examiner

AUTOMATIC DISPLAY UNIT BACKUP DURING FAILURES OF ONE MORE DISPLAY UNITS THROUGH THE UTILIZATION OF GRAPHIC USER INTERFACE OBJECTS DEFINED FOR CONTROL TRANSFER AND REVERSION AFTER RESOLUTION OF THE FAILURES

CROSS REFERENCE TO RELATED APPLICATIONS

This application is a divisional application of, and claims the priority of, U.S. patent application Ser. No. 15/616,905, filed Jun. 7, 2017, and entitled "AUTOMATIC DISPLAY UNIT BACKUP DURING FAILURES OF ONE MORE DISPLAY UNITS THROUGH THE UTILIZATION OF GRAPHIC USER INTERFACE OBJECTS DEFINED FOR CONTROL TRANSFER AND REVERSION AFTER RESOLUTION OF THE FAILURES", the entirety of which is expressly incorporated herein by reference.

TECHNICAL FIELD

The subject disclosure relates generally to flight management systems and to automatic display unit backup during failures of one more units through the utilization of graphic user interface objects defined for control transfer and reversion after resolution of the failures.

BACKGROUND

Flight management systems are employed within an aircraft cockpit to perform complex operations and/or complex calculations that facilitate adherence to a flight plan and that increase the safety of air travel. Various tasks associated with the flight management system can include controlling and/or modifying a multitude of parameters related to navigation of the aircraft. Due to the critical control applications being managed, performance of the complex functions on the multitude of parameters should be performed by the flight management system in real-time with as few disruptions as possible.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a system that can comprise a memory that stores executable components and a processor, operatively coupled to the memory, that executes the executable components. The executable components can comprise a first controller that operates a first display unit and a second controller that operates a second display unit. The first display unit can render a first set of data and the second display unit can render a second set of data. The executable components can also comprise a failure indication component that provides a first notification to the first controller based on a first detection of a first failure at the second controller, and a second notification to the second controller based on a second detection of a second failure at the first controller. Further, the executable components can comprise a control transfer component that automatically transfers control of the second display unit from the second controller to the first controller based on the first notification, or automatically transfers control of the first display unit from the first controller to the second controller based on the second notification. The control transfer component can automatically transfer control without receiving a manual input requesting the transfer.

In an implementation, the second controller facilitates a rendering of the first set of data on the second display unit in response to automatic transfer of control of the first display unit from the first controller to the second controller. According to another implementation, the first controller facilitates a rendering of the second set of data on the first display unit in response to automatic transfer of control of the second display unit from the second controller to the first controller. In another implementation, the first controller can render the first set of data on the first display unit and the second controller can render the second data on the second display unit as respective software units. The respective software units can be defined by attributes.

Also, in one or more embodiments, a method is provided. The method can comprise detecting, by a system comprising a processor, a failure of a first controller. The first controller can be operatively coupled to a first onside layer component and a first offside layer component. Further, the first onside layer component can operate a first display unit. The method can also comprise automatically transferring, by the system, a control of the first display unit to a second controller operatively coupled to a second onside layer component and a second offside layer component. The second onside layer component can operate a second display unit. Further, the transferring can comprise routing the control of the first display unit from the first onside layer component to the second offside layer component. Further, the method can comprise rendering, by the system, first data associated with the first display unit on the second display unit at substantially a same time as second data associated with the second display unit is displayed. The first display unit and the second display unit can be redundancy units of a flight management system. According to another implementation, transferring the control can be implemented in an absence of receipt of a manual input According to an implementation, rendering the first data and the second data can comprise allocating a portion of the first display unit for rendering the first data and a second portion of the first display unit for rendering the second data. In some implementations, the method can include monitoring, by the system, a first status of the first controller and transmitting, by the system, a first indication to the second controller to assume a primary display responsibility of the first display unit in response to a first detection of the failure based on the monitoring the first status.

In addition, according to one or more embodiments, provided is method that can comprise facilitating, by a system comprising a processor, a first rendering of first data on a first display unit via a first controller. The method can also include facilitating, by the system, a second rendering of second data on a second display unit via a second controller. In addition, the method can comprise detecting, by the system, a failure of the first controller and the second controller. The method can also comprise transferring, by the system, control of the first display unit from the first controller to a device external to the system. Further, the method can comprise transferring by the system, control of the second display unit from the second controller to the device external to the system.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Various aspects provided herein relate to flight management systems. Within a cockpit of an aircraft are a set of interactive display devices (or display units) that are utilized to display various graphical representations associated with the control and/or modification of a multitude of parameters associated with navigation of the aircraft. In an example, a machine-human interface (HMI) employed by the flight management system is governed by a standard referred to as ARINC 661, named for Aeronautical Radio, Incorporated (ARINC), which was charted by the Federal Communications Commission.

The ARINC 661 is an aeronautical standard that specifies a standardized framework for the definition of a Cockpit Display System (CDS) and an interface (e.g., communication) between the CDS, User Applications (UAs), and/or other avionic system equipment to manage various functions of the aircraft. For example, the ARINC 661 defines a Graphical User Interface (GUI) in binary Definition Files (DF).

The graphical portion of the embedded HMIs are described in the DFs. For example, the interface defined in the ARINC 661 utilizes a basic set of graphic user interface objects, described in the DFs as "widgets." Widgets are software units associated with a graphical representation and a behavior, which can facilitate receipt of the information by the flight crew and/or to provide instructions through the HMI.

Generally, widgets correspond to a displayable entity. Some of the widgets can be "interactive widgets," which support flight crewmember actions using various interface devices. Actions by crewmembers on interactive widgets can be associated with event reports sent to the UA (e.g., an indication of a failure). Non-interactive widgets do not have an associated event.

Discussed herein is the use of ARINC 661 widgets, which can facilitate automatic user application reversions upon system failures. Widgets utilized with the disclosed aspects can include a "No Service Monitor Widget," with a "Connector Widget" used under the "ShowNoServiceIdent" (or within a container). A similar mechanism can be accomplished with a Watchdog Container, by allowing a connector on the "ShowIfFailIdent" parameter. Either mechanism can allow for an automatic reversion on the displays from a primary subsystem to a secondary subsystem, as will now be described in further detail.

Figure 1:
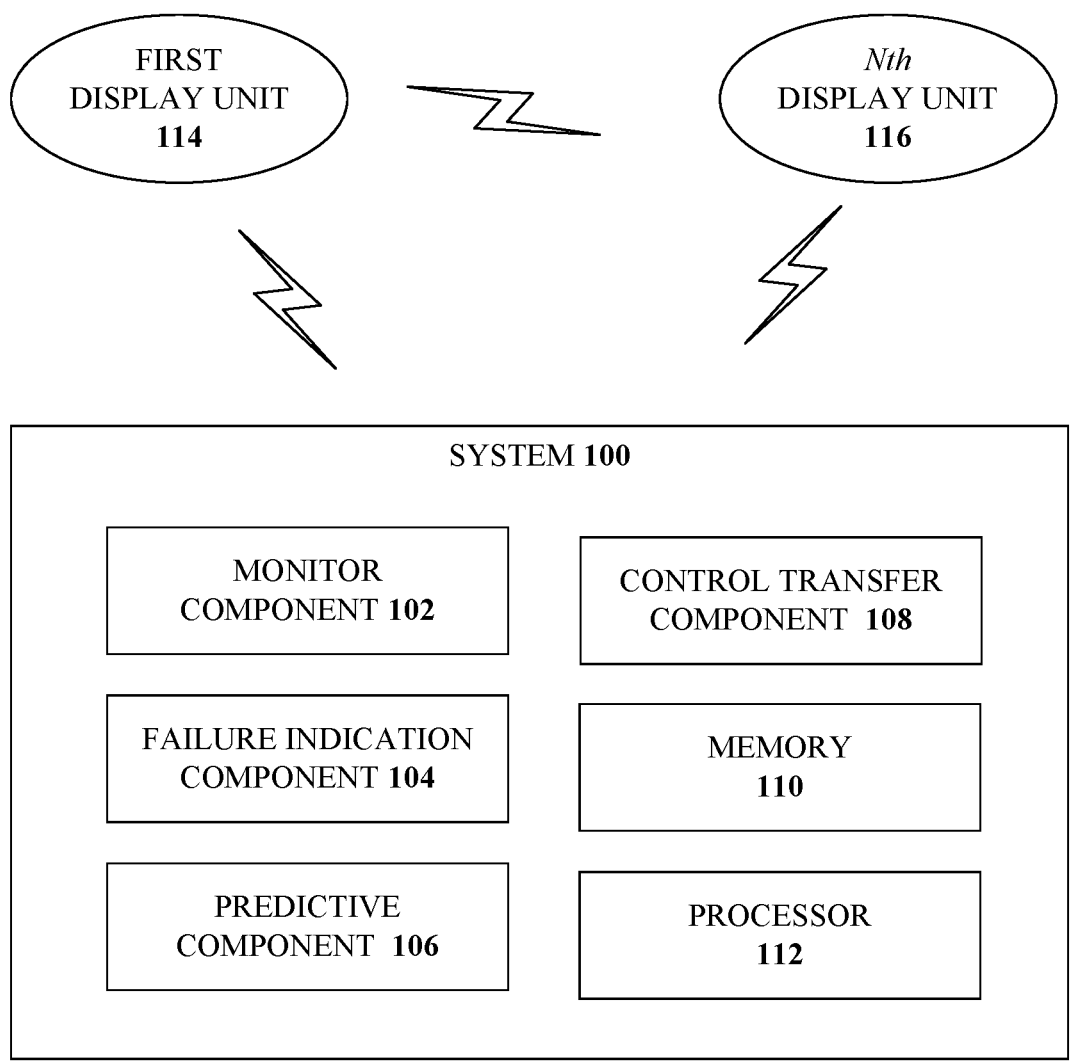
FIG. 1 illustrates an example, non-limiting, system for facilitating automatic display unit backup during failures of one more display units in accordance with one or more embodiments described herein.

FIG. 1 illustrates an example, non-limiting, system 100 for facilitating automatic display unit backup during failures of one more display units in accordance with one or more embodiments described herein. When recovery of a failure has been accomplished, an automatic reversion to a primary display unit can be facilitated as discussed herein.

During use of a flight management system, if a failure occurs, an indication is provided through one or more display units and a pilot manually flips or selects a flight deck switch to cause the display to change from one flight management system to the other flight management system. However, with the various aspects disclosed herein, if a failure is detected in one or more flight management system controls, there can be automatic reversion to another system, without a requirement for receipt of a manual input.

For example, based on a failure of a primary system, a connector can be used to automatically revert to the display of data at a secondary system. If there is a subsequent failure of the secondary system, a tertiary system can be utilized to perform the display functions. The tertiary system can be located within the aircraft (e.g., a mobile device associated with a pilot or other person aboard the aircraft) or remote from the aircraft (e.g., a ground control station, a mobile device associated with an authorized user on the ground, and so on). Further, when the primary system (and/or the secondary system) is no longer experiencing a failure, the connector can automatically return the display of data to the primary system (and/or the secondary system).

The system 100 can include a monitor component 102, a failure indication component 104, a predictive component 106, a control transfer component 108, at least one memory 110, and at least one processor 112. The monitor component 102 can observe a status of one or more display units associated with various control systems. As illustrated, there can be a first display unit 114 through an Nth display unit 116, where N is an integer. The display units can be operated through respective controllers comprising respective memories and processors. According to an implementation, a control system can be a flight management system and the display units can be included in an airplane cockpit display systems. The monitor component 102 can observe the status of hardware, software, and/or a communications network associated with the one or more display units.

Based on the observation of the monitor component 102, a failure indication component 104 can determine if a failure of the observed hardware, software, and/or communications network is detected for one or more of the display units. The failure indication can be associated with a display, with software controlling the display, and so on.

According to some implementations, the predictive component 106 can predict whether a failure is likely to occur based on one or more indications. For example, failure information can be tracked over time and retained as historical information. Various attributes associated with the display units can be compared to the historical information and, if there is a match, it can indicate that a similar failure might be experienced.

If a failure has occurred (as determined by the failure indication component 104) and/or is expected to occur (as determined by the predictive component 106), the control transfer component 108 can facilitate transfer of control of the display associated with the failure to another display control. For example, if a failure associated with the first display unit 114 is indicated, the control transfer component 108 can automatically switch control of the display to another controller for output at the Nth display unit 116. Upon or after resolution of the failure associated with the first display unit 114, the control transfer component 108 can automatically switch the return the control of the first display unit 114 to a controller responsible for operating the first display unit 114. FIGS. 2-5 below will provide further details related to the various aspects discussed herein.

Figure 2:
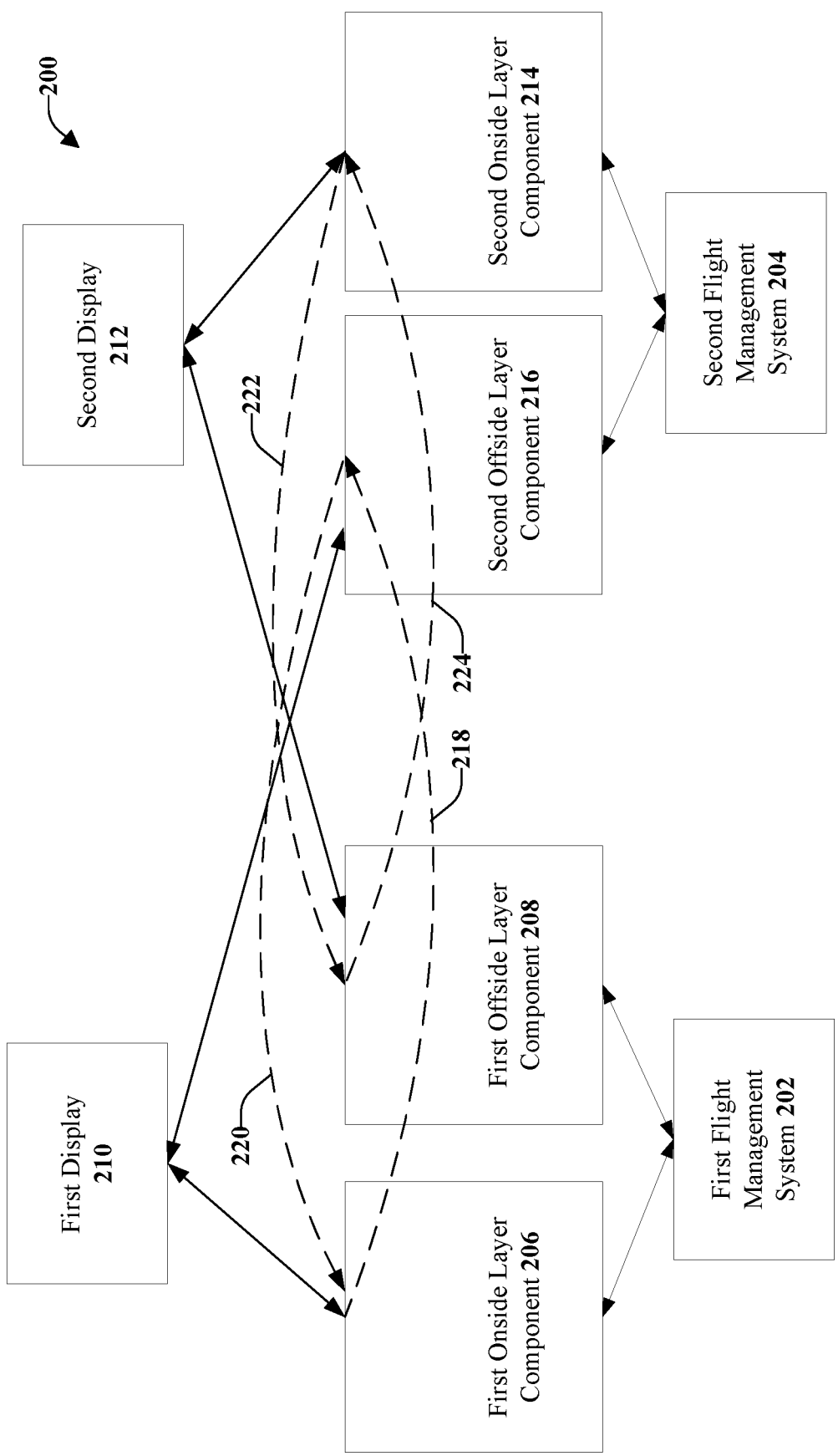
FIG. 2 illustrates an example, non-limiting, schematic representation routing for redundant display systems in accordance with one or more embodiments described herein.

FIG. 2 illustrates an example, non-limiting, schematic representation 200 of routing for redundant display systems in accordance with one or more embodiments described herein. Illustrated are a first flight management system 202 (FMS1) and a second flight management system 204 (FMS2). The first flight management system 202 can be operatively coupled to, and can control, a first onside layer component 206, which can be (and can include the functionality of) a first flight management system (FMS1) onside flight status display (FSD) layer. The first flight management system 202 can also be operatively coupled to, and can control, a first offside layer component 208, which can be (and can include the functionality of) a FMS1 offside FSD layer. The first onside layer component 206 can be operatively coupled to, and can control a first display 210 (e.g., a left-side display). The first offside layer component 208 can be utilized in the event of a failure associated with a second display 212 (e.g., a right-side display).

The second flight management system 204 can be coupled to, and can control a second onside layer component 214, which can be (and can include the functionality of) a FMS2 onside FSD layer. Further the second flight management system 204 can be coupled to, and can control, a second offside layer component 216, which can be (and can include the functionality of) a FMS2 offside FSD layer. The second onside layer component 214 can be coupled to, and can control, the second display 212. The second offside layer component 216 can be utilized in the event of a failure associated with the first display 210.

In an implementation when there is a failure associated with the first flight management system 202, operation of the first display 210 can be automatically transferred from the first onside layer component 206 to the second offside layer component 216, as indicated by line 218. The second onside layer component 214 retains control of second display 212. Thus during a failure of the first flight management system 202, the second flight management system 204 can control output of the information intended for the first display 210 and the second display 212. According to some implementations, the information can be displayed on a single display (e.g., the second display 212 in this example). However, according to some implementations, if the first display 210 is not experiencing a failure, the second offside layer component 216 can facilitate rendering of the respective information on the first display 210 and on the second display 212. After resolution of the failure at the first flight management system 202, control of the first display 210 can automatically be returned to the first onside layer component 206, as indicated by line 220.

In another implementation when there is failure associated with the second flight management system 204, operation of the second display 212 can be automatically transferred from the second onside layer component 214 to the first offside layer component 208, as indicated by line 222. In this implementation, the first onside layer component 206 retains control of the first display 210 and the first offside layer component 208 assumes control of the second display 212.

Thus during a failure of the second flight management system 204, the first flight management system 202 can control output of the information intended for the first display 210 and the second display 212. According to some implementations, the information can be displayed on a single display (e.g., the first display 210 in this implementation). However, according to some implementations, if the second display 212 is not experiencing a failure, the first offside layer component 208 can facilitate rendering of the respective information on the first display 210 and on the second display 212. After resolution of the failure at the second flight management system 204, control of the second display 212 can automatically be returned to the second onside layer component 214, as indicated by line 224.

Figure 3:
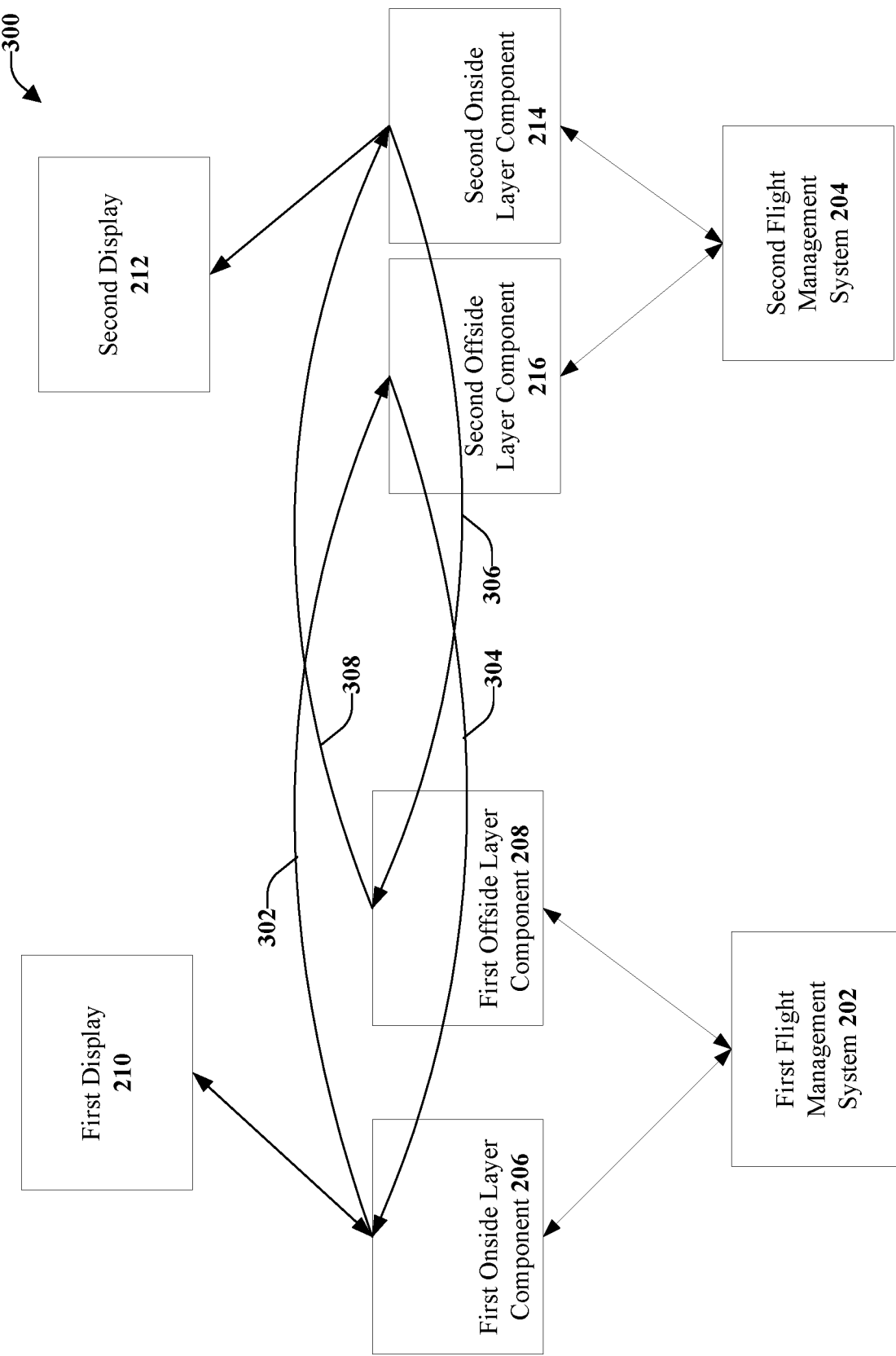
FIG. 3 illustrates an example, non-limiting, schematic representation of routing for an infinite looping initialization system in accordance with one or more embodiments described herein.
Figure 4:
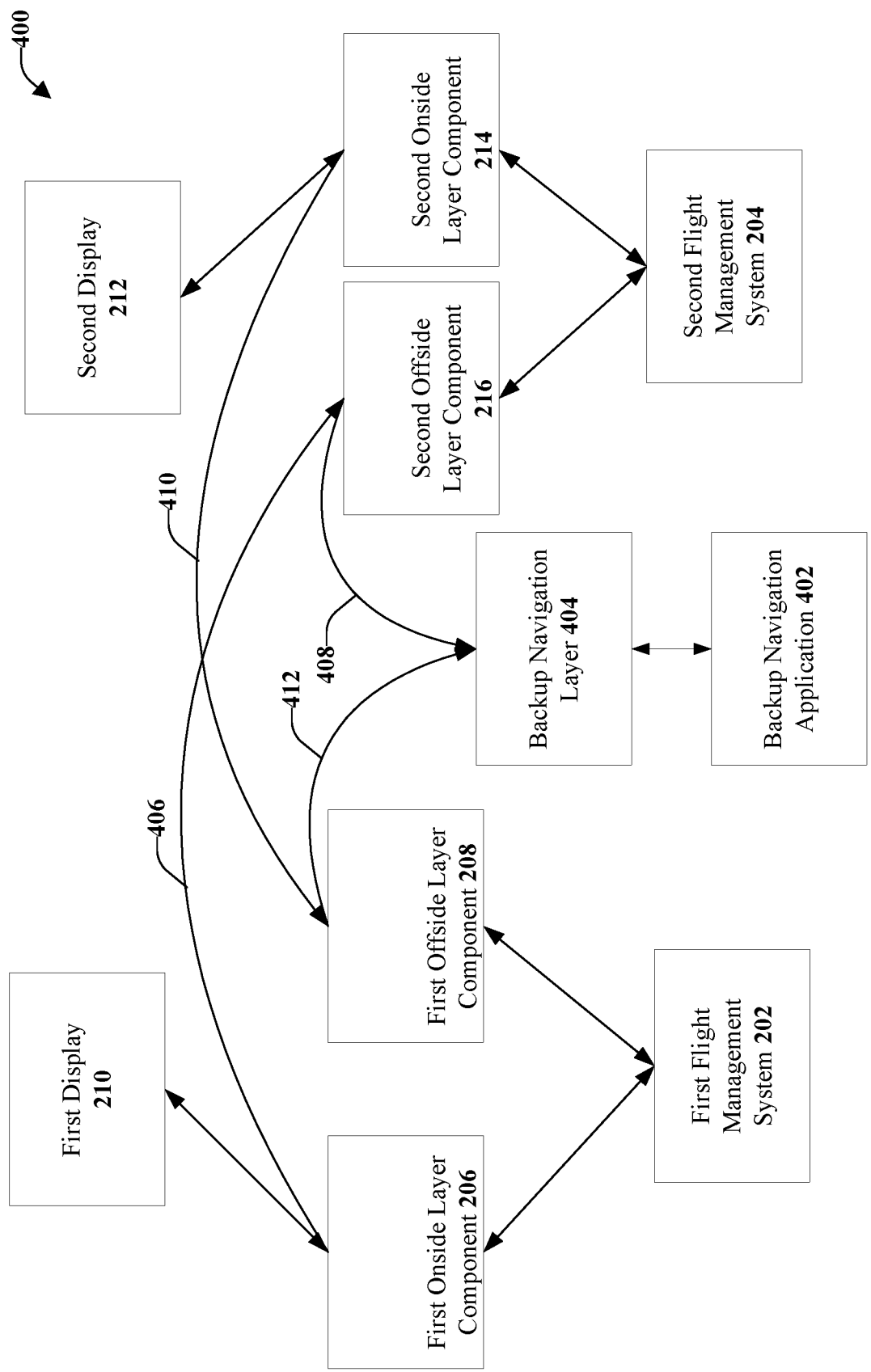
FIG. 4 illustrates an example, non-limiting, schematic representation for routing to a backup system in accordance with one or more embodiments described herein.

In a further implementation, there might be a failure of both the first flight management system 202 and the second flight management system 204. In this situation, for the first display 210, the first onside layer component 206 would attempt to transfer control to the second offside layer component 216. However, since the second flight management system 204 is experiencing a failure, the transfer does not occur (e.g., NoService: FMS Fail Flag) and the first display 210 is rendered inoperable. In a similar manner, for the second display 212, the second onside layer component 214 would attempt to transfer control to the first offside layer component 208. However, since the first flight management system 202 is also experiencing failure (e.g., NoService: FMS Fail Flag), the transfer does not occur and the second display 212 is rendered inoperable. According to an implementation, to address this issue, an infinite looping connection can be provided, as illustrated in FIG. 3 below. In accordance with another implementation, to address this issue, a backup system can be utilized as illustrated in FIG. 4 below.

In further detail, respective widgets can be associated with the first onside layer component 206, the first offside layer component 208, the second onside layer component 214, and the second offside layer component 216. For example, the widget can be a "NoServiceMonitor" widget, which can be utilized to display information with no communication between the UA and CDS is possible. For example, the first onside layer component 206 can include the following example, non-limiting, widget:

NoServiceMonitor
    NoService: Connector second offside layer component 216
    Service: FSD Widget Tree Further, the first offside layer component 208 can include the following example, non-limiting, widget:

NoServiceMonitor
    NoService: FMS Fail Flag
    Service: FSD Widget Tree

The second onside layer component 214 can include the following example, non-limiting, widget:

NoServiceMonitor
    NoService: Connector first offside layer component 208
    Service: FSD Widget Tree Additionally, the second offside layer component 216 can include the following example, non-limiting, widget:

NoServiceMonitor
    NoService: FMS Fail Flag
    Service: FSD Widget Tree

FIG. 3 illustrates an example, non-limiting, schematic representation 300 of routing for an infinite looping initialization system in accordance with one or more embodiments described herein. Repetitive description of like elements employed in other embodiments described herein is omitted for sake of brevity. In the implementation of FIG. 3, the operation is similar to the operation of FIG. 2 in the situations where there is no failure and/or only one flight management system experiences a failure. Accordingly, the details related to these operations are omitted for sake of brevity.

However, in this case, when there is a failure of both the first flight management system 202 and the second flight management system 204, an infinite looping can be created. The infinite looping can be utilized to avoid a situation where both displays are rendered inoperable due to failure of both the first flight management system 202 and the second flight management system 204.

During failure of both the first flight management system 202 and the second flight management system 204, operation for the first display 210 can be automatically transferred from the first onside layer component 206 to the second offside layer component 216, as indicated by line 302. However, since the second flight management system 204 is also experiencing a failure, a transfer back to the first onside layer component 206 is automatically implemented, as indicated by line 304. If the first flight management system 202 is still experiencing a failure, transfer is attempted to the second offside layer component 216 (e.g., line 302). This looping can continue until one of the flight management systems returns on line, or after a defined time out period.

In a similar manner, for operation of the second display 212, an automatic transfer of control from the second onside layer component 214 to the first offside layer component 208 is attempted, as indicated by line 306. Since the first flight management system 202 is experiencing a failure, a transfer back to the second onside layer component 214 is automatically performed, as indicated by line 308. If the second flight management system 204 is still experiencing a failure, transfer is attempted to the first offside layer component 208 (e.g., line 306). This looping can continue until one of the flight management systems returns on line, or after a defined time out period.

It is noted that the attempted transfers along line pairs 302/304 and 306/308 can be recursive until one or both flight management systems are no longer experiencing a failure. According to some implementations, a time limit can be associated with the infinite looping, wherein after expiration of the timer, attempted transfers are discontinued and both displays are rendered inoperable. In another attempt, a defined number of transfers can be attempted, after which the attempted transfers are discontinued.

In further detail, respective widgets can be associated with the first onside layer component 206, the first offside layer component 208, the second onside layer component 214, and the second offside layer component 216. For example, the widget can be a "NoServiceMonitor" widget, which can be utilized to display information with no communication between the UA and CDS is possible. For example, the first onside layer component 206 can include the following example, non-limiting, widget:

NoServiceMonitor
    NoService: Connector second offside layer component 216
    Service: FSD Widget Tree Further, the first offside layer component 208 can include the following example, non-limiting, widget:

NoServiceMonitor
    NoService: Connector second onside layer component 214
    Service: FSD Widget Tree The second onside layer component 214 can include the following example, non-limiting, widget:

NoServiceMonitor
    NoService: Connector first offside layer component 208
    Service: FSD Widget Tree Additionally, the second offside layer component 216 can include the following example, non-limiting, widget:

NoServiceMonitor
    NoService: Connector first onside layer component 206
    Service: FSD Widget Tree FIG. 4 illustrates an example, non-limiting, schematic representation 400 for routing of a backup system in accordance with one or more embodiments described herein. Repetitive description of like elements employed in other embodiments described herein is omitted for sake of brevity. In the implementation of FIG. 4, the operation is similar to the operation of FIG. 2 in the implementations where there is no failure and/or only one flight management system experiences a failure. Accordingly, the details related to these operations are omitted for sake of brevity.

A backup navigation application 402 can be operatively coupled to a backup navigation layer 404. The following explains the routing when there is a failure of both the first flight management system 202 and the second flight management system 204. Based on detection of failure at the first flight management system 202 control is automatically transferred from the first onside layer component 206 to the second offside layer component 216, as indicated by line 406. However, since the second flight management system 204 is also experiencing a failure, the second offside layer component 216 automatically transfers control to the backup navigation layer 404, as indicated by line 408.

In a similar manner, due to the failure of the second flight management system 204, control of the second display 212 is automatically transferred from the second onside layer component 214 to the first offside layer component 208, as indicated by line 410. Since the first flight management system 202 is experiencing a failure, the first offside layer component 208 automatically transfers the control to the backup navigation layer 404, as indicated by line 412.

The backup navigation layer 404 can retain control for the first display 210 and the second display 212 until receipt of a first indication that the first flight management system 202 is no longer experiencing a failure and/or receipt of a second indication that the second flight management system 204 is no longer experiencing a failure.

If the first indication is received, the backup navigation layer 404 can automatically return control of the first display 210 to the first onside layer component 206 and can return control of the second display 212 to the first offside layer component 208. If the second indication is received, the backup navigation layer 404 can automatically return control of the second display 212 to the second onside layer component 214 and control of the first display 210 to the second offside layer component 216.

In further detail, respective widgets can be associated with the first onside layer component 206, the first offside layer component 208, the second onside layer component 214, and the second offside layer component 216. For example, the widget can be a "NoServiceMonitor" widget, which can be utilized to display information with no communication between the UA and CDS is possible. For example, the first onside layer component 206 can include the following example, non-limiting, widget:

NoServiceMonitor
   NoService: Connector second offside layer component 216
   Service: FSD Widget Tree Further, the first offside layer component 208 can include the following example, non-limiting, widget:

NoServiceMonitor
   NoService: Backup Nay—Backup Navigation Layer 404
   Service: FSD Widget Tree The second onside layer component 214 can include the following example, non-limiting, widget:

NoServiceMonitor
   NoService: Connector first offside layer component 208
   Service: FSD Widget Tree Additionally, the second offside layer component 216 can include the following example, non-limiting, widget:

NoServiceMonitor
   NoService: Backup Nay—Backup Navigation Layer 404
   Service: FSD Widget Tree According to some implementations, the backup navigation application 402 and/or the backup navigation layer 404 can be included, at least partially, on a separate device. For example, the separate device can be a user equipment device, such as a device associated with a pilot, co-pilot, or another crewmember. In another example, the separate device can be a control tower device or other ground based device. In the case of a control tower or ground based device, the operation of the aircraft can be performed remotely (e.g., from the ground) in the case of personnel on the aircraft no longer being able to operate the aircraft.

Figure 5:
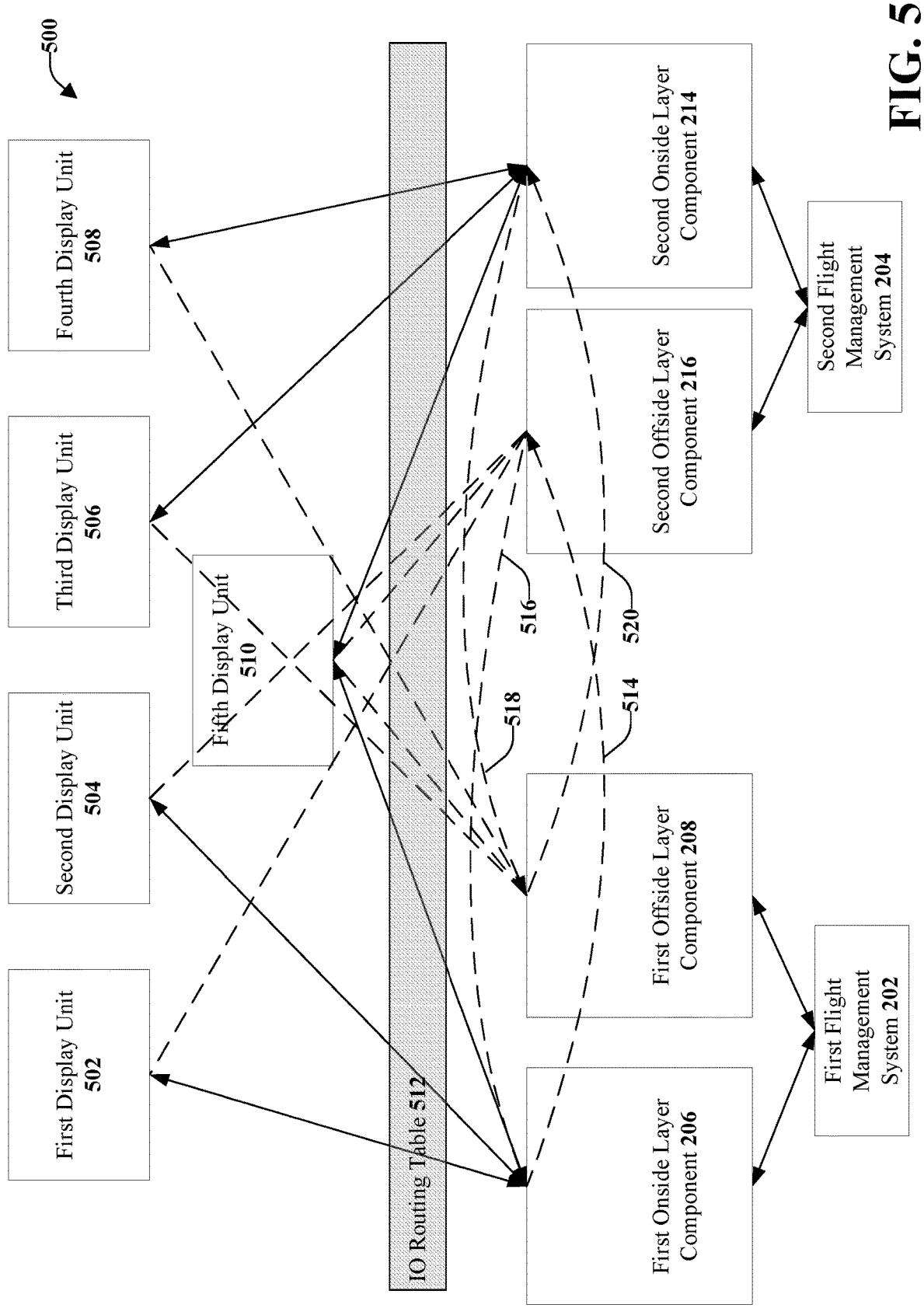
FIG. 5 illustrates an example, non-limiting, alternative schematic representation of routing for an implementation with multiple displays units in accordance with one or more embodiments described herein.

FIG. 5 illustrates an example, non-limiting, alternative schematic representation 500 of routing for an implementation with multiple displays units in accordance with one or more embodiments described herein. Repetitive description of like elements employed in other embodiments described herein is omitted for sake of brevity.

In this implementation, there are five display units (DUs), illustrated as a first display unit 502, a second display unit 504, a third display unit 506, a fourth display unit 508, and a fifth display unit 510. Also illustrated is an Input/Output (IO) routing table 512.

As illustrated, the first onside layer component 206 can be operatively coupled to, and can control operation of, the first display unit 502, the second display unit 504, and the fifth display unit 510 (represented by solid lines). Further, the second onside layer component 214 can be operatively coupled to, and can control operation of, the third display unit 506, the fourth display unit 508, and the fifth display unit 510.

If there is a failure of the first flight management system 202, the operation of the first display unit 502, the second display unit 504, and the fifth display unit 510 can be seamlessly transferred to the second offside layer component 216, as indicated by line 514. Upon or after the automatic transfer of control to the second offside layer component 216, a connection is established between the second offside layer component 216, the first display unit 502, the second display unit 504, and the fifth display unit 510, as indicated by the dashed lines. When the failure of the first flight management system 202 is resolved, control can be automatically transferred from the second offside layer component 216 to the first onside layer component 206, as indicated by line 516.

In a similar manner if there is a failure of the second flight management system 204, the operation of the third display unit 506, the fourth display unit 508, and the fifth display unit 510 can be automatically transferred from the second onside layer component 214 to the first offside layer component, as indicated by line 518. Upon or after the automatic transfer of control to the first offside layer component 208, a connection is established between the third display unit 506, the fourth display unit 508, and the fifth display unit 510, as indicated by the dashed lines. When the failure of the second flight management system 204 is resolved, control can be automatically returned to the second onside layer component 214, as indicated by line 520.

The schematic representation 500 of FIG. 5 blends together User Application Definition File (UADF) layer structures, internal FMS IO, and internal FMS HMI processing as the conceptual routing. FIG. 5 illustrates the IO runtime routing of traffic. Except for the fifth display unit 510, only two connections are utilized to each display unit. The fifth display unit can utilize four connections. This is because the fifth display unit 510 could controlled by the first onside layer component 206 and the second onside layer component 214 in the absence of failures and by the first offside layer component 208 and/or the second offside layer component 216 when one or more failures of the flight management systems are experienced.

In accordance with various implementations, when there is a failure of both the first flight management system 202 and the second flight management system 204, similar routing as discussed with FIG. 3 and/or FIG. 4 can be employed for the implementations that comprise more than two displays.

In further detail, respective widgets can be associated with the first onside layer component 206, the first offside layer component 208, the second onside layer component 214, and the second offside layer component 216. For example, the widget can be a "NoServiceMonitor" widget, which can be utilized to display information with no communication between the UA and CDS is possible. For example, the first onside layer component 206 can include the following example, non-limiting, widget:
NoServiceMonitor
  NoService: Connector second offside layer component 216
  Service: FSD Widget Tree Further, the first offside layer component 208 can include the following example, non-limiting, widget:
NoServiceMonitor
  NoService: FMS Fail Flag
  Service: FSD Widget Tree The second onside layer component 214 can include the following example, non-limiting, widget:
NoServiceMonitor
  NoService: Connector first offside layer component 208
  Service: FSD Widget Tree Additionally, the second offside layer component 216 can include the following example, non-limiting, widget:
NoServiceMonitor
  NoService: FMS Fail Flag
  Service: FSD Widget Tree With reference again to FIG. 1, the at least one memory 110 can be operatively coupled to the at least one processor 112. The at least one memory 110 can store computer executable components and/or computer executable instructions. The at least one processor 112 can facilitate execution of the computer executable components and/or the computer executable instructions stored in the at least one memory 110. The term "coupled" or variants thereof can include various communications including, but not limited to, direct communications, indirect communications, wired communications, and/or wireless communications.

Further, the at least one memory 110 can store protocols associated with facilitating management of user application failure modes and reversions as discussed herein. Further, the at least one memory 110 can facilitate action to control communication between the system 100, other systems, and/or other devices, such that the system 100 can employ stored protocols and/or algorithms to achieve improved management and reversions determination as described herein.

It is noted that although the one or more computer executable components and/or computer executable instructions can be illustrated and described herein as components and/or instructions separate from the at least one memory 110 (e.g., operatively connected to at least one memory 110), the various aspects are not limited to this implementation. Instead, in accordance with various implementations, the one or more computer executable components and/or the one or more computer executable instructions can be stored in (or integrated within) the at least one memory 110. Further, while various components and/or instructions have been illustrated as separate components and/or as separate instructions, in some implementations, multiple components and/or multiple instructions can be implemented as a single component or as a single instruction. Further, a single component and/or a single instruction can be implemented as multiple components and/or as multiple instructions without departing from the example embodiments.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 112 can facilitate respective analysis of information related to failure events. The at least one processor 112 can be a processor dedicated to analyzing and/or generating reversion actions based on data received, a processor that controls one or more components of the system 100, and/or a processor that both analyzes and generates models based on data received and controls one or more components of the system 100.

Figure 6:
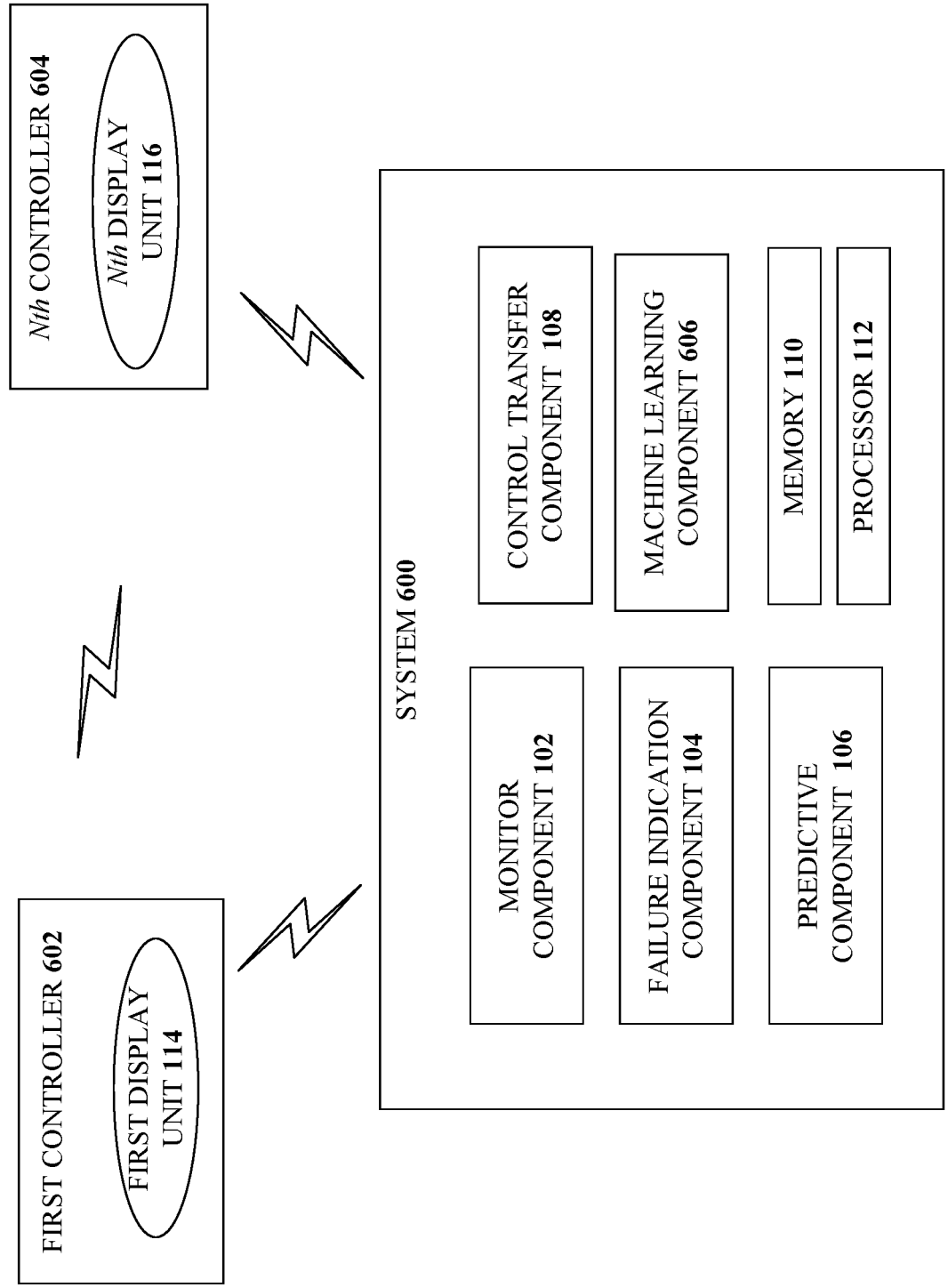
FIG. 6 illustrates an example, non-limiting, system for employing machine learning to automate one or more aspects in accordance with one or more embodiments described herein.

FIG. 6 illustrates an example, non-limiting, system 600 for employing machine learning to automate one or more aspects in accordance with one or more embodiments described herein. Repetitive description of like elements employed in other embodiments described herein is omitted for sake of brevity. The system 600 can comprise one or more of the components and/or functionality of the system 100 and/or the routing discussed with respects to FIGS. 2-5, and vice versa.

A first controller 602 can operate the first display unit 114, which can render a first set of data. An Nth controller 604 can operate the Nth display unit 116, which can render a second set of data. The monitor component 102 can observe operations of the first display unit 114, the Nth display unit 116, the first controller 602, and/or the Nth controller 604. The first display unit 114 and the Nth display unit 116 can be redundancy display units of a flight management system. In an example, the first controller 602 can render the first set of data on the first display unit 114 and the Nth controller 604 can render the Nth set of data on the Nth display unit 116 as respective software units, wherein the respective software units are defined by attributes.

The failure indication component 104 can provide a first notification to the first controller 602 based on a first detection of a first failure at the Nth controller 604. Further, the failure indication component 104 can provide a second notification to the Nth controller 604 based on a second detection of a second failure at the first controller 602. According to some implementations, the controllers can fail at substantially the same time and/or a failure of the controllers can overlap for at least a portion of time. However, the disclosed aspects are not limited to this implementation. Instead, the controllers of can independently fail while other controllers do not experience a failure.

Based on the one or more failures, the control transfer component 108 can automatically transfer control of the first display unit 114 from the first controller 602 to the Nth controller 604 based on the first notification. Alternatively or additionally, the control transfer component 108 can automatically transfer control of the Nth display unit 116 from the Nth controller 604 to the first controller 602 based on the second notification. The control transfer component 108 can automatically perform the control transfer without receiving a manual input requesting the transfer (e.g., an action by the pilot is not necessary).

In an example, the Nth controller 604 can facilitate a rendering of the first data on the Nth display unit 116 in response to automatic transfer of control of the first display unit 114 from the first controller 602 to the Nth controller 604. In another example, the first controller 602 can facilitate a rendering of the second data on the first display unit 114 in response to automatic transfer of control of the Nth display unit 116 from the Nth controller 604 to the first controller 602.

The control transfer component 108 can automatically return the control of the first display unit 114 to the first controller 602 based on a determination that the failure of the first controller 602 is resolved. Additionally or alternatively, the control transfer component 108 can automatically return the control of the Nth display unit 116 to the Nth controller 604 based on a determination that the failure of the Nth controller 604 is resolved.

In accordance with an implementation, the system 600 can be implemented for onboard avionics of an aircraft. Further to this implementation, the first display unit 114 and the Nth display unit 116 can be cockpit display units. In addition, the system 600 can operate in accordance with an ARINC 661 aeronautical standard.

The system 600 can also include a machine learning and reasoning component 606, which can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 606 can employ principles of probabilistic and decision theoretic inference. Additionally or alternatively, the machine learning and reasoning component 606 can rely on predictive models constructed using machine learning and/or automated learning procedures. Logic-centric inference can also be employed separately or in conjunction with probabilistic methods.

The machine learning and reasoning component 606 can infer a failure of one or more display units and/or associated controllers by obtaining knowledge about the respective hardware, software, and other parameters of the display units. According to a specific implementation, the system 600 can be implemented for onboard avionics of an aircraft. The one or more display units can be cockpit display units. Further to this implementation, the system 600 can operate in accordance with an ARINC 661 aeronautical standard.

Based on the knowledge, the machine learning and reasoning component 606 can make an inference based on whether one or more display units has failed, or is predicted to fail, and one or more actions to take based on the failure determination.

As used herein, the term "inference" refers generally to the process of reasoning about or inferring states of the system, a component, a module, the environment, and/or assets from a set of observations as captured through events, reports, data and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with automatic display unit backup during failures of one more display units through the utilization of structure functional description language defined for control transfer and reversion after resolution of the failures) can employ various artificial intelligence-based schemes for carrying out various aspects thereof. For example, a process for evaluating one or more parameters of a display unit can be utilized to predict a failure of the display unit, which can be enabled through an automatic classifier system and process.

A classifier is a function that maps an input attribute vector, $x=(x1, x2, x3, x4, xn)$, to a confidence that the input belongs to a class. In other words, $f(x)=\text{confidence}(\text{class})$. Such classification can employ a probabilistic and/or statistical-based analysis (e.g., factoring into the analysis utilities and costs) to prognose or infer an action that should be employed to determine whether to transfer control of a display from a controller, which controller the control of the display should be transferred to, and so on. In the case of display units, for example, attributes can be identification of a known failure pattern based on historical information and the classes are criteria of how to mitigate effects of the failure by offloading the control to another system component.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording asset behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining according to a predetermined criteria how to transfer control, the capabilities of other devices to handle control for a failed unit, and so forth. The criteria can include, but is not limited to, similar events, historical information, and so forth.

Additionally or alternatively, an implementation scheme (e.g., a rule, a policy, and so on) can be applied to control and/or regulate implementation of automatic display unit backup during failures of one more display units through the utilization of structure functional description language defined for control transfer and reversion after resolution of the failures, and so forth. In some implementations, based upon a predefined criterion, the rules-based implementation can automatically and/or dynamically interpret how to respond to a particular unit failure. In response thereto, the rule-based implementation can automatically interpret and carry out functions associated with transfer of control based on the graphic user interface objects by employing a predefined and/or programmed rule(s) based upon any desired criteria.

According to some implementations, the various systems can include respective interface components or display units that can facilitate the input and/or output of information to the one or more display units. For example, a graphical user interface can be output on one or more display units and/or mobile devices as discussed herein, which can be facilitated by the interface component. A mobile device can also be called, and can contain some or all of the functionality of a system, subscriber unit, subscriber station, mobile station, mobile, mobile device, device, wireless terminal, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects can also be implemented with wired devices, or with both wired and wireless devices.

The display units (as well as other interface components discussed herein) can provide, a command line interface, a speech interface, Natural Language text interface, and the like. For example, a Graphical User Interface (GUI) can be rendered that provides a user with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Methods that can be implemented in accordance with the disclosed subject matter, will be better appreciated with reference to the following flow charts and/or the above routing diagrams. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, the methods can be performed by a system comprising a processor. Additionally or alternatively, the method can be performed by a machine-readable storage medium and/or a non-transitory computer-readable medium, comprising executable instructions that, when executed by a processor, facilitate performance of the methods.

Figure 7:
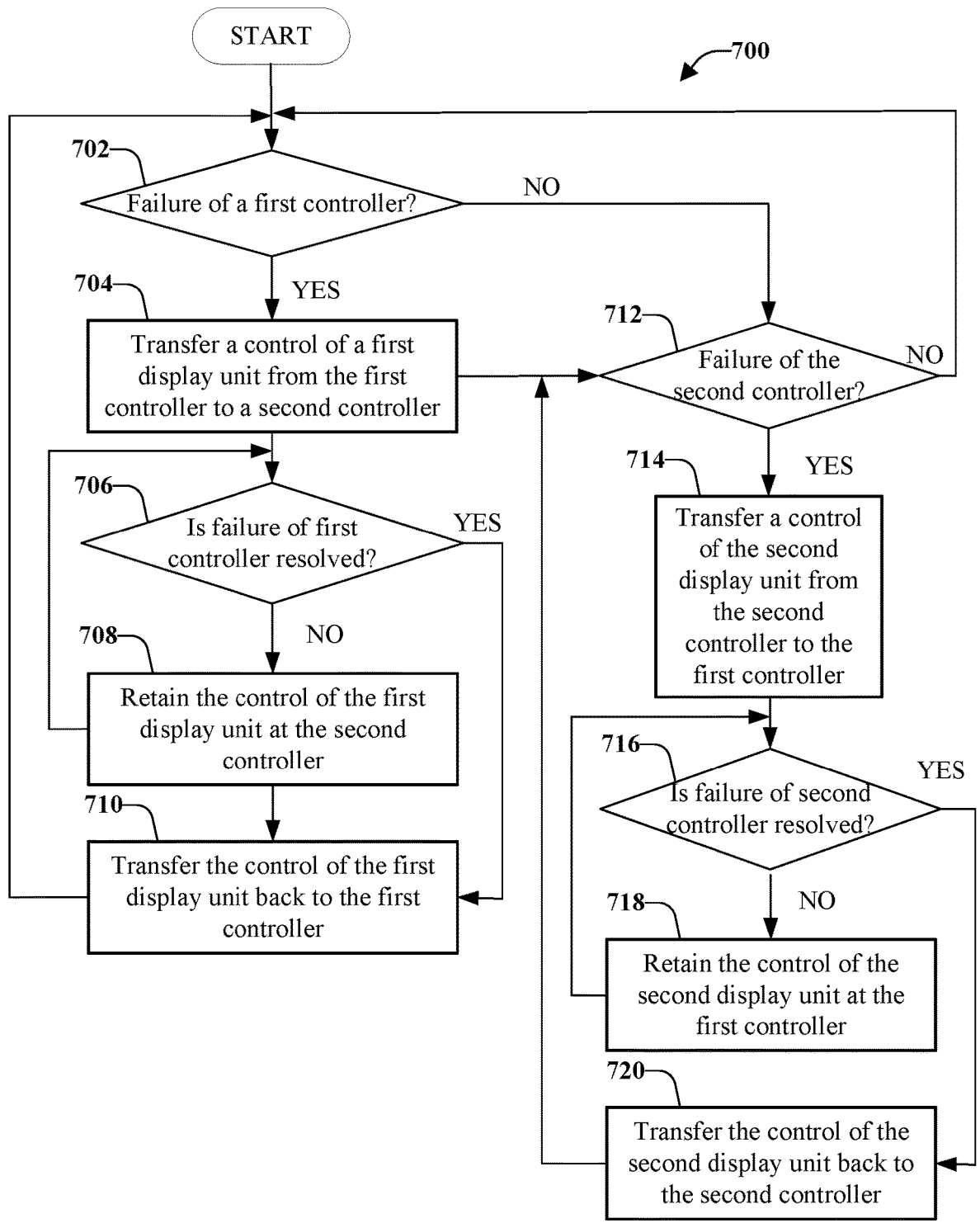
FIG. 7 illustrates an example, non-limiting, method for facilitating the implementation of software units to manage user application failure modes and reversions in accordance with one or more embodiments described herein.

FIG. 7 illustrates an example, non-limiting, method 700 for facilitating the implementation of software units to manage user application failure modes and reversions in accordance with one or more embodiments described herein.

The method 700 starts, at 702, with a determination whether a failure of a first controller has been detected. The failure can be determined based on receipt of a failure indication from the first controller or another component. In another example, the failure can be determined based on one or more precursors that indicate a failure is likely to occur (e.g., based on analysis of historical information).

If a failure of the first controller is detected ("YES"), at 704, a control of a first display unit is transferred from the first controller to a second controller. At 706, a determination is made whether the failure of the first controller has been resolved. If the failure has not been resolved ("NO"), at 708, the control of the first display unit can be retained with the second controller. The method 700 can return to the determination at 706. It is to be understood that the determination of whether the failure has been resolved and retaining the control at the second controller can be recursive. For example, operation of the first controller can be reviewed continuously, periodically, randomly, at various intervals, and so on.

If the determination at 706, is that the failure of the first controller has been resolved ("YES"), at 710, the control of the first display unit is transferred back to the first controller. The method 700 can return to 702 to monitor the first controller for another failure.

Alternatively or additionally, if the determination at 702 is that the first controller has not failed ("NO"), at 712 a determination is made whether the second controller has failed. If there is no failure of the second controller, the method 700 can return to 702 with an evaluation of the first controller.

However, if the determination at 712 is that the second controller has failed ("YES"), at 714, a control of the second display unit is transferred form the second controller to the first controller. A determination is made, at 716, whether the failure of the second controller has been resolved. If not ("NO"), at 718, the control of the second display unit is retained at the first controller. The method 700 can return to 716 in a recursive manner to determine if the failure associated with the second controller has been resolved.

If, at 716, it is determined that the failure of the second controller has been resolved ("YES"), the control of the second display unit is returned to the second controller, at 720. The method 700 can return to 712 to determine if the second controller experiences another failure.

Figure 8:
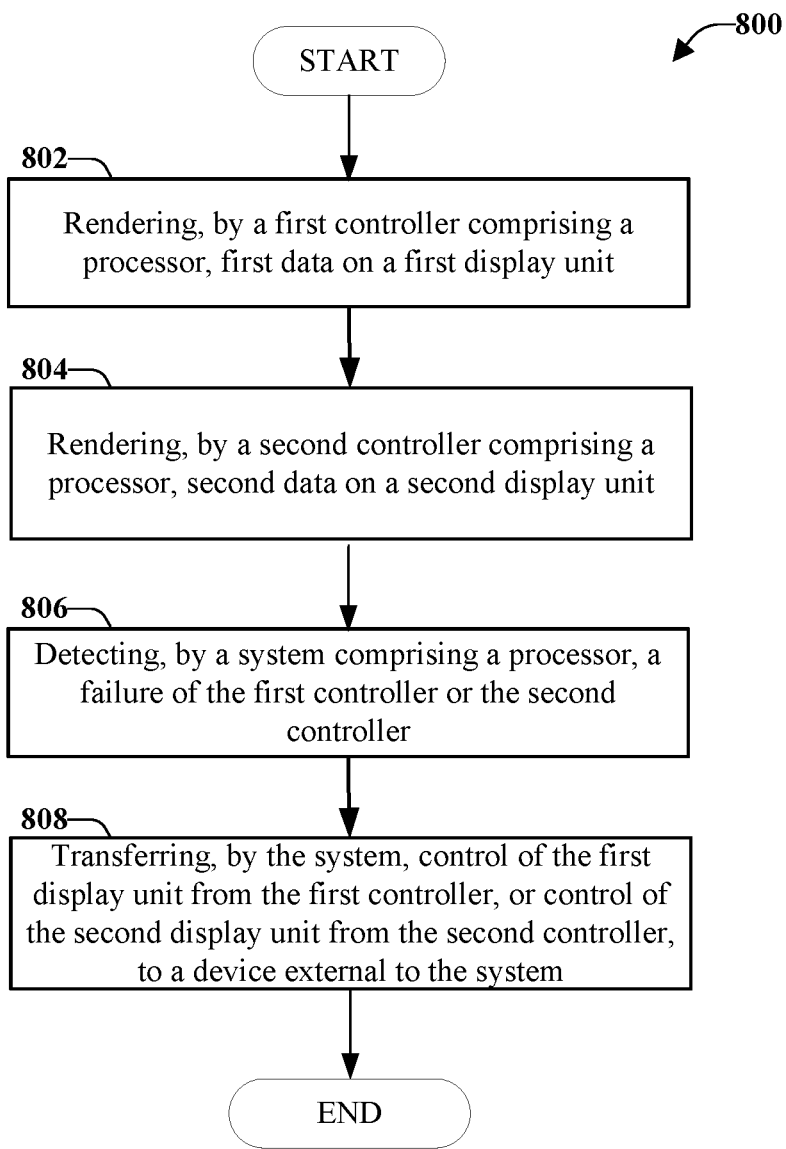
FIG. 8 illustrates an example, non-limiting, method for detecting a failure at one or more controllers and automatically transferring a rendering of the data from the failed controllers to a remote device in accordance with one or more embodiments described herein.

FIG. 8 illustrates a method 800 for detecting a failure at one or more controllers and automatically transferring a rendering of the data from the failed controllers to a remote device in accordance with one or more embodiments described herein.

At 802, a first controller comprising a processor facilitates a rendering of first data on a first display unit. The first data can be rendered based on one or more software units (e.g., widgets). A second controller comprising a processor can facilitate a rendering of second data on a second display unit, at 804. The second data can be rendered based various software units (e.g., widgets).

At 806, a failure of the first controller of the second controller can be detected. Based on the failure, at 808, control of the first display unit is transferred from the first controller and/or control of the second display unit is transferred from the second controller to a device external to the system (e.g., a remote device). For example, the device external to the system can be user equipment device authorized for use during a failure. In another example, the device external to the system can be a device associated with ground control.

According to an implementation, transferring the control can comprise facilitating, by the system, the rendering of the first data on the device in response to the failure of the first controller and/or the rendering of the second data on the device in response to the failure of the second controller.

In some implementations, there might be a failure of both the first controller and the second controller. Further to these implementations, in response to the failure of the first controller and the second controller, a rendering of the first data and the second data is facilitated by the device external to the system.

According to an implementation, the first display unit and the second display unit are located in an airplane cockpit and the device external to the system is a ground-based device. In accordance with some implementations, the device external to the system can be a user equipment device.

As discussed herein, provided is the use of an ARINC 661 No Service Monitor Widget, with a Connector Widget used under the ShowNoServiceIdent (or within a container), which can allow for automatic User Application Reversions upon system failures. A similar mechanism can be accomplished with a Watchdog Container, by allowing a connector on the ShowIfFailIdent parameter. Either mechanism can allow for an automatic reversion on the displays from a primary subsystem to a secondary subsystem.

Further, including an ARINC 661 Connector widget under the ShowNoServiceIdent branch (directly or within a container) of a NoServiceMonitor widget can allow for automatic reversion to secondary systems upon failure of a primary system. For example, a primary system can include a NoServiceMonitor widget at the top level of its ARINC 661 User Application Layer Definition. Upon failure of the primary system, a connector can be used to automatically revert to displaying data from a secondary system. By also including a NoServiceMonitor widget on the secondary system, with a similar connection, a tertiary system could also be introduced.

Flight Management Systems (FMS) are an example of where this system could be utilized. Typically, the pilot must flip a flight deck switch to revert their displays from one FMS to another FMS. If both FMSes have failed, a Backup Navigation (aka Alternate Navigation) system is provided that can take over the navigation function, as discussed herein. By the automatic reversion capabilities discussed herein, completely automatic failure reversion is possible without intervention by the flight crew.

In addition, by allowing for automatic display reversion, the flight deck does not need to install a separate switch to allow the flight crew to select reversion to secondary systems. Also, since the display system should be the same, or a higher level DO-178B certification (typically the display system would be a Level A certification), it can act as an independent monitor for subsystems connecting to it (for example a flight management system). This mechanism can also provide for backup navigation (also referred to as alternate navigation) systems to replace flight management system data directly on primary displays, rather than requiring an alternate display area.

According to some implementations, a similar mechanism can be designed using custom widgets or by adding new widgets not yet included in the ARINC 661 standard, as discussed herein.

Previous to an automatic reversion mechanism as discussed herein, the flight deck would have required a separate switch to select a secondary system. Alternatively, a separate application would be needed to monitor the health of the primary system to allow reversion to the secondary system upon a failure in the primary system. Since the display is a DO-178 DAL Level A system, it suffices as a secondary system to perform the reversion.

Figure 9:
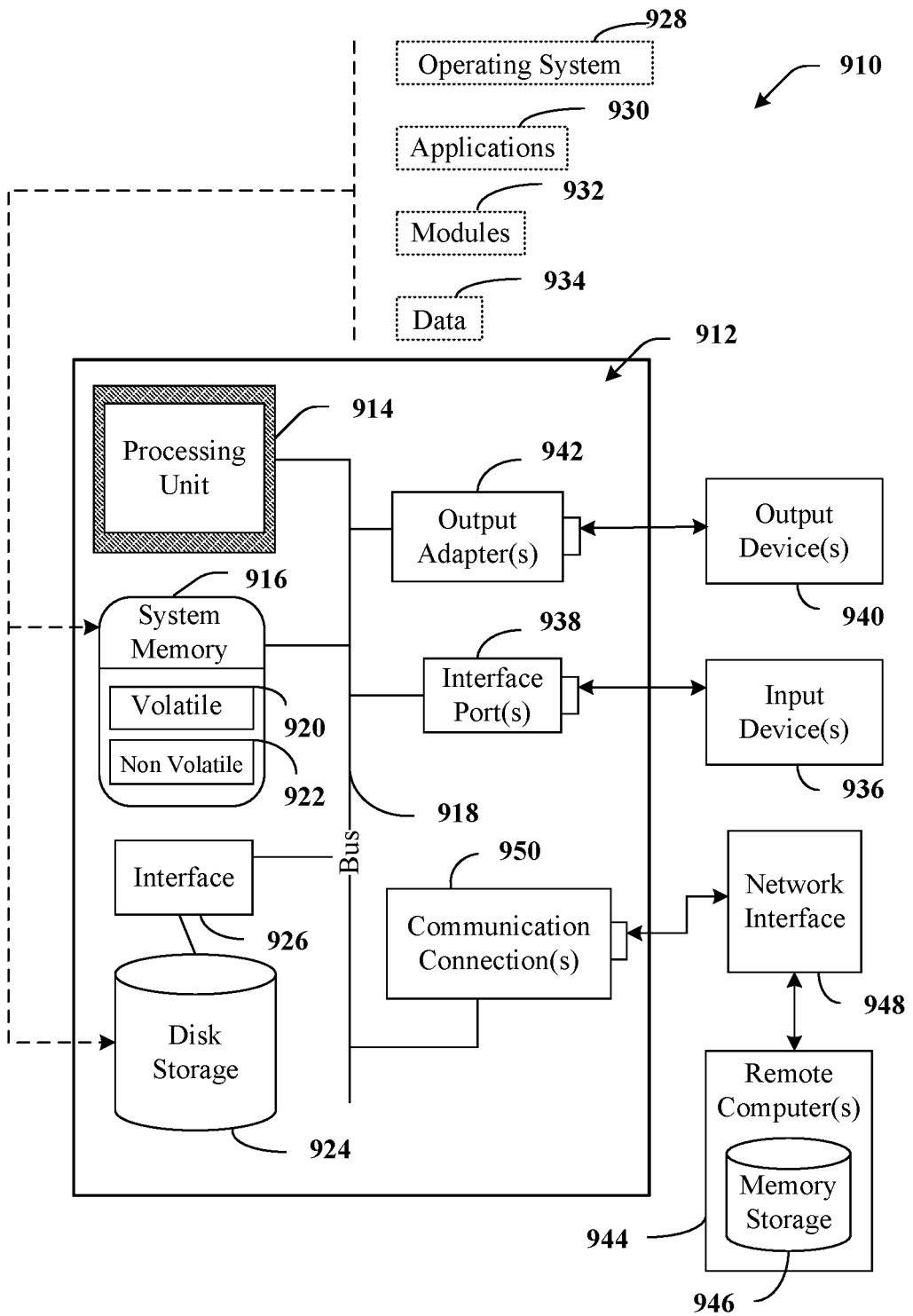
FIG. 9 illustrates an example, non-limiting, computing environment in which one or more embodiments described herein can be facilitated.
Figure 10:
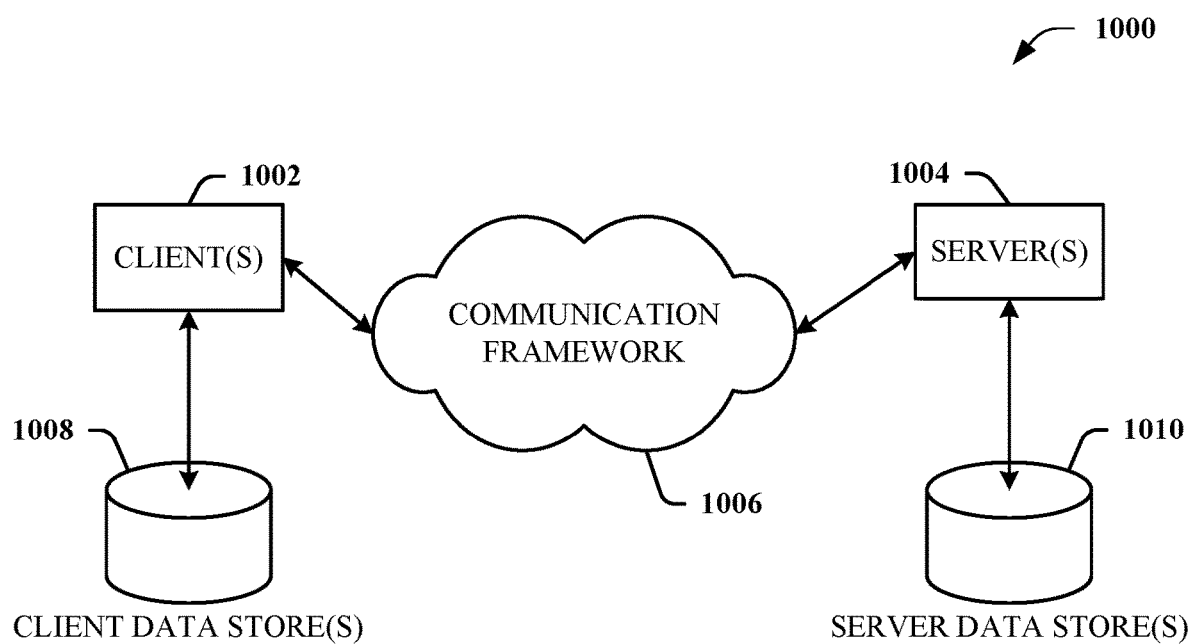
FIG. 10 illustrates an example, non-limiting, networking environment in which one or more embodiments described herein can be facilitated.

In order to provide a context for the various aspects of the disclosed subject matter, FIGS. 9 and 10 as well as the following discussion are intended to provide a brief, general description of a suitable environment in which the various aspects of the disclosed subject matter can be implemented.

With reference to FIG. 9, an example environment 910 for implementing various aspects of the aforementioned subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable PROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   predicting, by a system comprising a processor, a first failure of a first controller using a predictive failure model and based on a parameter of the first controller, wherein the predictive failure model has been generated using machine learning employing probabilistic classification, wherein the first controller is operatively coupled to a first onside layer component and a first offside layer component, and wherein the first onside layer component operates a first display unit;

automatically transferring, by the system, a first control of the first display unit to a second controller operatively coupled to a second onside layer component and a second offside layer component, the second onside layer component operates a second display unit, and wherein the transferring comprises routing the first control of the first display unit from the first onside layer component to the second offside layer component;

rendering, by the system, first data associated with the first display unit on the second display unit concurrently with displaying second data associated with the second display unit, wherein the first display unit and the second display unit are redundancy units of a flight management system;

predicting, by the system and using the predictive failure model, a second failure of the second controller;

automatically transferring, by the system, the first control of the first display unit and a second control of the second display unit to a third controller that performs respective display functions of the first display unit and the second display unit, wherein the third controller is associated with a user equipment device;

determining, by the system, that the second failure is resolved; and automatically returning, by the system, the second control of the second display unit, wherein the third controller continues to perform a respective display function of the first display unit.

2. The method of claim 1, wherein the rendering the first data and the second data comprises allocating a portion of the second display unit for rendering the first data and a second portion of the second display unit for rendering the second data.

3. The method of claim 1, further comprising:
determining, by the system, a resolution of the first failure at the first controller; and
returning, by the system, the first control of the first display unit from the second offside layer component to the first onside layer component, wherein the first data is rendered on the first display unit and the second data is rendered on the second display unit.

4. The method of claim 1, further comprising
monitoring, by the system, a first status of the first controller; and
transmitting, by the system, a first indication to the second controller to assume a primary display responsibility of the first display unit in response to a first detection of the first failure based on the monitoring the first status.

5. The method of claim 1, wherein the transferring the first control is implemented in an absence of receipt of a manual input for a transfer of the first control.

6. The method of claim 1, further comprising:
attempting, by the system, to return the first control of the first display unit to the first onside layer component; and
in response to an indication that the first controller is experiencing the first failure, retaining the first control of the first display unit at the second offside layer component.

7. The method of claim 6, further comprising:
attempting, by the system, to return the first control of the first display unit to the first onside layer component; and
in response to another indication that the first controller is no longer experiencing the first failure, returning the first control of the first display unit to the first onside layer component.

8. A system, comprising:
a processor; and
a memory that stores executable instructions that, when executed by the processor, facilitate performance of operations, comprising:
predicting a first failure of a first controller using a predictive failure model and based on a parameter of the first controller, wherein the first controller is operatively coupled to a first onside layer component and a first offside layer component that operates a first display unit, and wherein the predictive failure model has been generated using machine learning employing inference and probabilistic based determination;
dynamically transferring a first control of the first display unit to a second controller operatively coupled to a second onside layer component and a second offside layer component, the second onside layer component operates a second display unit, wherein the transferring comprises routing the first control of the first display unit from the first onside layer component to the second offside layer component;
rendering, via the second display unit, first data associated with the first display unit concurrently with displaying second data associated with the second display unit, wherein the first display unit and the second display unit are redundancy units of a flight management system;
predicting, using the predictive failure model, a second failure of the second controller;
dynamically transferring the first control of the first display unit and a second control of the second display unit to a third controller that performs respective display functions of the first display unit and the second display unit, wherein the third controller is associated with a user equipment device;
determining that the second failure is resolved; and
dynamically returning the second control of the second display unit, wherein the third controller continues to perform a respective display function of the first display unit.

9. The system of claim 8, wherein a first portion of the second display unit is allocated for the first data and a second portion of the second display unit is allocated for the second data.

10. The system of claim 8, wherein the operations further comprise:
determining that the first failure at the first controller is resolved, and
transferring the first control of the first display unit from the second offside layer component to the first onside layer component, wherein the first data is rendered on the first display unit and the second data is rendered on the second display unit.

11. The system of claim 8, wherein the operations further comprise:
    determining a status of the first controller; and
    sending a notice to the second controller to assume a primary display responsibility of the first display unit in response to a detection of the first failure.

12. The system of claim 8, wherein dynamically transferring the first control of the first display unit to the second controller comprises dynamically transferring the first control of the first display unit to the second controller in an absence of a manual request for the transfer of the first control.

13. The system of claim 8, wherein the operations further comprise:
    attempting to return the first control of the first display unit to the first onside layer component, and
    in response to receiving an indication that the first controller is experiencing the first failure, retaining the first control of the first display unit at the second offside layer component.

14. The system of claim 13, wherein the operations further comprise:
    in response to another indication that the first controller is no longer experiencing the first failure, returning the first control of the first display unit to the first onside layer component.

15. The system of claim 8, wherein the user equipment device comprises a handheld communication device.

16. A non-transitory machine-readable medium, comprising executable instructions that, when executed by a processor, facilitate performance of operations, comprising:
    predicting a first failure of a first controller using a predictive failure model and based on a parameter of the first controller, wherein the first controller, wherein the first controller is operatively coupled to a first onside layer component and a first offside layer component that operates a first display unit, and wherein the predictive failure model has been generated using machine learning employing Bayesian networks;
    dynamically transferring a first control of the first display unit to a second controller operatively coupled to a second onside layer component and a second offside layer component, the second onside layer component operates a second display unit, wherein the transferring comprises routing the first control of the first display unit from the first onside layer component to the second offside layer component;
    rendering, via the second display unit, first data associated with the first display unit concurrently with displaying second data associated with the second display unit, wherein the first display unit and the second display unit are redundancy units of a flight management system;
    predicting, using the predictive failure model, a second failure of the second controller;
    dynamically transferring the first control of the first display unit and a second control of the second display unit to a third controller that performs respective display functions of the first display unit and the second display unit, wherein the third controller is associated with a user equipment device;
    determining that the first failure or the second failure is resolved; and
    in response to a determination that the first failure is resolved, automatically returning the first control of the first display unit, wherein the third controller continues to perform a respective display function of the second display unit, or in response to a determination that the second failure is resolved, facilitating a return of the second control of the second display unit, wherein the third controller continues to perform a respective display function of the first display unit.

17. The non-transitory machine-readable medium of claim 16, wherein the first display unit and the second display unit are located in an airplane cockpit.

18. The non-transitory machine-readable medium of claim 16, wherein the third controller is associated with an external device.

19. The non-transitory machine-readable medium of claim 16, wherein user equipment device comprises a handheld communication device.

20. The non-transitory machine-readable medium of claim 19, wherein the handheld communication device is located in an airplane cockpit.

* * * * *